United States Patent [19]

Ooe et al.

[11] Patent Number: 4,985,213

[45] Date of Patent: Jan. 15, 1991

[54] EXHAUST GAS TREATING APPARATUS

[75] Inventors: Takashi Ooe, Yokohama; Shinji Ogawa, Takaishi; Akiko Miura, Yokohama; Ryohei Itatani, Kyoto, all of Japan

[73] Assignee: Mitsui Toatsu Chemicals, Inc., Tokyo, Japan

[21] Appl. No.: 355,660

[22] Filed: May 23, 1989

[30] Foreign Application Priority Data

May 26, 1988 [JP] Japan ................................. 63-126914

[51] Int. Cl.$^5$ ........................... B01J 19/08; B01J 19/12
[52] U.S. Cl. ........................... 422/186.01; 422/186.03; 422/186.18; 422/186.21
[58] Field of Search ................... 55/100; 422/186.03, 422/186.01, 186.04, 186.18, 186.19, 186.21, 906

[56] References Cited

U.S. PATENT DOCUMENTS

| | | | |
|---|---|---|---|
| 2,454,757 | 11/1948 | Smith | 422/186.03 |
| 2,929,771 | 3/1960 | Landis et al. | 422/186.03 |
| 3,842,286 | 10/1974 | Imris | 422/186.03 |
| 4,342,918 | 8/1982 | Tanaka et al. | 422/186.04 |

FOREIGN PATENT DOCUMENTS 295083 12/1988 European Pat. Off. .
296720 12/1988 European Pat. Off. .

OTHER PUBLICATIONS

Patent Abstracts of Japan, vol. 7, No. 69, Nippon Penshin Denwa Kosha, Mar. 23, 1983.

*Primary Examiner*—Charles T. Jordan
*Assistant Examiner*—J. Woodrow Eldred
*Attorney, Agent, or Firm*—Burns, Doane, Swecker & Mathis

[57] ABSTRACT

An exhaust gas treating apparatus comprised of a discharge tube consisting of a tubular chamber having a gas introduction opening and a gas withdrawal opening and a cathode and an anode provided therein so as to form a gas flow passage, and a dc or ac power supply connected to the electrodes. The cathode is a cathode pair composed of at least one pair of cathodes positioned opposite to each other nearly parallel to the gas flow passage, and a space defined by the cathode pair communicates at one end with the gas introduction opening and at the other with the gas withdrawal opening. The anode is an anode pair composed of at least one pair of anodes positioned opposite to each other within the above space in a direction approximately at right angles to the cathodes and without contact with the cathodes. A magnetic field applying means for forming a dc or ac magnetic field is provided in a direction opposing the cathode. Optionally, at least one auxiliary anode is provided nearly parallel to the anode pair within the space defined by the cathode pair and the anode pair.

14 Claims, 12 Drawing Sheets

EXHAUST GAS TREATING APPARATUS

BACKGROUND OF THE INVENTION

1. Field of the Invention

This invention relates to an apparatus for detoxifying an exhaust gas by a discharge plasma. More specifically, this invention relates to an apparatus for treating an exhaust gas by which a reactive gas discharged in a thin film forming technique utilizing vacuum, for example, various chemical vapor phase growing methods such as a vacuum chemical vapor deposition (CVD) method, a plasma CVD method, a light CVD method and a plasma etching method is treated with a plasma in vacuum (under reduced pressure).

2. Description of the Prior Art

Reactive gases used in various CVD methods or the plasma etching method for thin film formation utilizing vacuum are not all consumed at the time of film formation, and the unreacted gases remain or by-product gases are generated. Sometimes, in the process of thin film formation, the starting gases may be discharged from a pump without going through CVD or etching. When released into the atmosphere without treatment, many of these reactive gases have a risk of explosion, and some of them are toxic, to cause accidents and air pollution. Accordingly, the permissible concentrations of these gases in the atmosphere are regulated.

Dilution with a large excess of an inert gas, a catalyzed chemical reaction, wet absorption, wet adsorption, and dry adsorption, for example, have been used to detoxify these reactive gases. All of these methods are performed under atmospheric pressure after evacuation by a vacuum pump, and require high costs for equipment and operation. In addition, if proper maintenance is not exercised, safety cannot be secured, and there is a risk of accidents.

As another type of technology, there was proposed an exhaust gas treating method utilizing discharge (discharge treatment method). This method, in contrast to the above-described methods, is characterized by the fact that the gas is treated under vacuum before it is discharged from a pump out of the system. For example, Japanese Laid-Open Patent Publication No. 129868/1976 discloses a treating method by which an exhaust gas containing toxic substances is contacted with an oxidizing agent in a plasma thereby converting the toxic substances into stable compounds, and these compounds are removed from the exhaust gas. Japanese Laid-Open Patent Publication No. 6231/1983 discloses an exhaust gas treating apparatus which is interposed between a reaction vessel from which a reactive exhaust gas is discharged and a discharging device and decomposes the exhaust gas by a discharge and discharges the treated gas. With this type of apparatus, the range of loads capable of maintaining a plasma required for detoxify the exhaust gas to a predetermined concentration is naturally limited, and it is difficult to maintain a stable plasma condition for great load variations, above all pressure variations. The range of application of this apparatus has to be limited.

Recently, there was proposed a method involving utilizing a plasma having a magnetic field superimposed thereon in the discharge treatment method to make it possible to follow load variations (the magnetic field superimposing method) [Society of Applied Physics, Meeting for Studying Plasma Electronics, January 1986]. In the magnetic field superimposing method, the turning radius of an electron in the plasma becomes small, and the electron can turn between electrodes upon application of a dc or ac magnetic field at an angle of about 45° to about 135° to the direction of an electric field generated by the electrodes. Hence, a stable discharge under a load with a broad range of 0.01 m torr to several tens of torr can be maintained.

The discharge treating method, as stated above, is characterized by the fact that the gas is treated under vacuum before it is discharged from the pump out of the system. Inevitably, therefore, the discharge treating apparatus is disposed between the CVD apparatus or etching apparatus and the vaccum discharge pump. Accordingly, the discharge treatment apparatus applicable for practical purposes is required to be as small as possible in size and energy-saving so that it can be easily built between the CVD apparatus or etching apparatus and the vacuum discharge pump. The prior technical literature, however, only discloses the basic concept of superimposing and applying a magnetic field and cause the plasma condition to follow load variations, and does not specifically teach anything on actual conditions for meeting the above requirement, for example, the prescription of optimum structures and sizes of electrodes for generating the plasma. Thus, no exhaust gas treating apparatus which can be used for practical purposes has yet been realized.

It is an object of this invention to provide a discharge treatment apparatus which is sufficiently small-sized and energy-saving for practical application.

The present inventors extensively made investigations in order to achieve this object, and have consequently found that by placing a cathode face to face with a cathode and an anode face to face with an anode with the cathode pair and the anode pair in a specified positional relationship to form a space defined by the cathode pair and the anode pair, preferably providing at least one auxiliary anode approximately parallel to the anode pair in the space defined by the cathode pair and the anode pair, and thereafter applying a magnetic field in the opposing direction of the cathodes, the speed of treating the gas per unit volume of the treating apparatus can be markedly increased and the treating apparatus can be operated stably over long periods of time.

SUMMARY OF THE INVENTION

According to this invention, there is first provided an exhaust gas treating apparatus comprising a discharge tube consisting of a tubular chamber having a gas introduction opening and a gas withdrawal opening and a cathode and an anode provided in the tubular chamber so as to form a gas flow passage, and a dc or ac power supply connected to the electrodes; wherein the cathode is a cathode pair composed of at least one pair of cathodes positioned opposite to each other and approximately parallel to the gas flow passage, a space defined by the cathode pair is in communication at one end with the gas introduction opening and at the other end with the gas withdrawal opening, the anode is an anode pair consisting of at least one pair of anodes positioned in said space opposite to each other in a direction nearly at right angles to the cathodes and without contact with the cathodes, and a magnetic field applying means is secured to the discharge tube for generating a dc or ac magnetic field in the opposing direction of the cathodes.

According to this invention, there is also provided an exhaust gas treating apparatus comprising a discharge tube consisting of a tubular chamber having a gas introduction opening and a gas withdrawal opening and a cathode and an anode provided in the tubular chamber so as to form a gas flow passage, and a dc or ac power supply connected to the electrodes; wherein the cathode is a cathode pair composed of at least one pair of cathodes positioned opposite to each other and approximately parallel to the gas flow passage, a space defined by the cathode pair is in communication at one end with the gas introduction opening and at the other end with the gas withdrawal opening, the anode is an anode pair consisting of at least one pair of anodes positioned in said space opposite to each other in a direction nearly at right angles to the cathodes and without contact with the cathodes, at least one auxiliary anode is provided nearly parallel to the anode pair in a space formed by the cathode pair and the anode pair, and a magnetic field applying means is secured to the discharge tube for generating a dc or ac magnetic field in the opposing direction of the cathodes.

BRIEF DESCRIPTION OF THE DRAWINGS

FIGS. 2 (a) to 2 (h) are cross-sectional views showing examples of the structure of electrodes in this invention;

FIGS. 3, 4 (a) and 4 (b) show examples of the structure of two sets of electrodes in this invention arranged in series, FIG. 3 being a vertical sectional view and FIGS. 4 (a) and 4 (b) being cross-sectional views taken on line A—A' of FIG. 3;

FIGS. 5 (a) and 5 (b) are cross-sectional views showing other examples of the structure of the electrodes in this invention;

FIGS. 7 (a) to 10 (a) are cross-sectional views showing examples of the apparatus of this invention using columnar electrodes; and FIGS. 7 (b) to 10 (b) are vertical sectional views thereof.

DETAILED DESCRIPTION OF THE INVENTION

The gases to be treated by the present invention are gases or vapors which are used in the CVD methods or the plasma etching method and if released into the atmosphere without treatment, are likely to cause some accident or pollution, particularly those to which conventional treating methods such as catalyst treatment, absorption treatment or adsorption treatment are difficult to apply. Examples include silane-type gases such as monosilane, disilane and trisilane (which are decomposed into silicon or hydrogenated amorphous silicon and hydrogen by the discharge treatment in accordance with this invention); alkylsilane-type gases such as monomethylsilane and dimethylsilane (which are decomposed into hydrogenated amorphous silicon carbide and hydrogen by the discharge treatment in accordance with this invention); germanium-type gases (which are decomposed into hydrogenated amorphous germanium and hydrogen by the discharge treatment in accordance with this invention); alkoxysilane-type gases such as tetramethoxysilane and tetraethoxysilane); chlorosilane-type gases; and fluorosilane-type gases. Borane-type gases such as diborane; alkylborane-type gases such as trimethylboron; and phosphine-type gases can also be treated by the apparatus of this invention. These gases can be more effectively treated by adding oxygen or the like. Gases to which the present invention can be applied are not limited to the above-described gases. They may be mixtures of these gases or those which are diluted with inert gases, hydrogen or nitrogen.

The preferred embodiments of the practice of this invention will be described with reference to the accompanying drawings.

Figure 1:
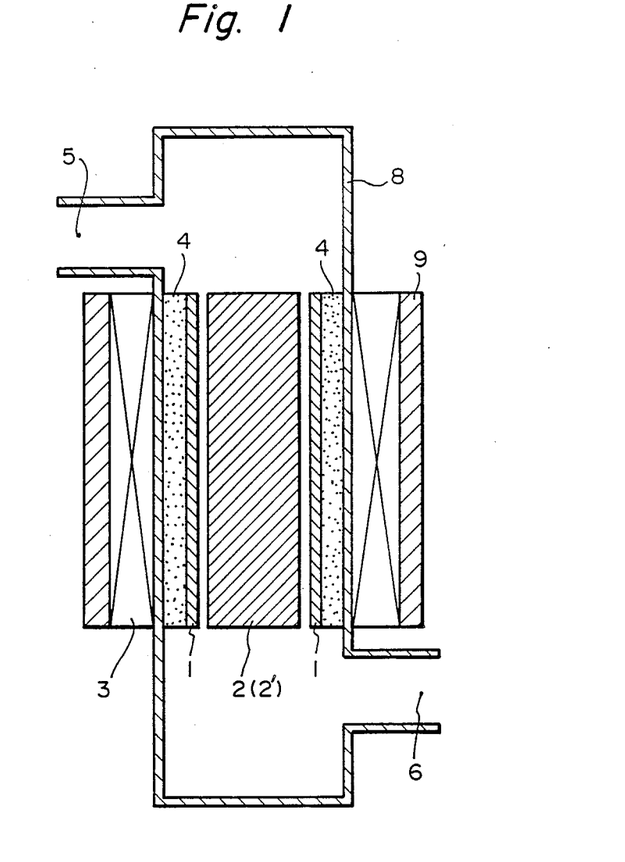
FIG. 1 is a vertical sectional view showing one example of the structure of the exhaust gas treating apparatus of the invention.

One example of the main electrode structure of the exhaust gas treating apparatus provided by this invention is shown in FIG. 1. FIGS. 2 (a) to 2 (e) are sectional views of the apparatus of FIG. 1, and in FIG. 2 (e), auxiliary electrodes are provided in the apparatus of FIG. 2 (a).

Generally, many discharge apparatuses are of the type in which a cathode is placed face to face with an anode. In such a cathode-anode opposing structure, a distribution in electron density occurs in a plasma positive column and it is not easy to form a small-sized uniform and very strong plasma. In contrast, in the apparatus of this invention, at least one pair of cathodes are placed in opposition. When the cathodes are so placed in opposition, a very strong plasma confined between the cathodes can be formed partly because the electron turning radius becomes small when a magnetic field is superimposed The apparatus of this invention is an exhaust gas treating apparatus comprising a discharge tube (8) consisting of a tubular chamber having a gas introduction opening (5) and a gas withdrawal opening (6) and a cathode and an anode provided in the tubular chamber so as to form a gas flow passage, and a dc or ac power supply (not shown) connected to the electrodes; wherein the cathode is a cathode pair (1) composed of at least one pair of cathodes positioned opposite to each other and approximately parallel to the gas flow passage, a space defined by the cathode pair (1) is in communication at one end with the gas introduction opening (5) and at the other end with the gas withdrawal opening (6), the anode is an anode pair (2) consisting of at least one pair of anodes positioned in said space opposite to each other in a direction nearly at right angles to the cathodes and without contact with the cathodes, and a magnetic field applying means (3) is secured to the discharge tube (8) for generating a dc or ac magnetic field in the opposing direction of the cathodes.

In a preferred embodiment of the apparatus of this invention, at least one auxiliary anode (2') is disposed nearly parallel to the anode (2) without contact with the cathode (1) in a space within the discharge tube which is defined by the cathode pair (1) and the anode pair (2). Examples of the auxiliary anode (2') are shown in FIGS. 2 (e), 2 (f), 2 (g), 2 (h), 4 (b) and 5 (b) [the apparatuses in these drawings are obtained by disposing the auxiliary anode (2') in the apparatuses of FIGS. 2 (a), 2 (b), 2 (c), 2 (d), 4 (a) and 5 (a)].

In the apparatus of FIG. 1, the cathode pair (1) composed of two plate-like cathodes placed opposite to each other nearly parallel to the gas flow passage connecting the gas introduction opening (5) and the gas withdrawal opening (6), and the magnetic field applying means such as permanent magnets (3) is provided in the discharge tube (8) at the back surfaces of the cathodes so that the N-pole of one magnet faces the S-pole of the other magnet. This arrangement makes it possible to apply a dc magnetic field in the cathode opposing direction. The reference numeral (9) represents a yoke.

Since the intensity of the magnetic field is inversely proportional to the square of the distance, the opposing distance of the cathode pair (1) is desirably small. Furthermore, to increase the current density per unit volume, the opposing distance is desirably small. The optimum value of the opposing distance of the cathode pair may vary depending upon the pressure and the composition of the gas to be treated, but is preferably about 5 mm to 80 mm, more preferably 10 mm to 40 mm.

In the apparatus shown in FIG. 1, the anode pair (2) composed of two plate-like anodes placed opposite to each other without contact with the cathodes and approximately at right angles to the cathode pair (1), preferably nearly in parallel to the gas flowing passage is provided [FIGS. 2 (a) to 2 (d)]. More preferably, at least one auxiliary anode (2') is provided nearly parallel to the anodes (2) without contact with the cathodes (1) in a discharge space defined by the cathode pair (1) and the anode pair (2) [FIGS. 2 (e) to 2 (h)].

When in the apparatus of this invention, the cathodes and anodes are connected to the power supply and an electric field is formed between the electrodes, a plasma is generated in a space defined by the cathode pair and the anode pair.

In the present invention, the distance between the electrodes in the anode pair is desirably at least two times, preferably 2 to 40 times, the distance between the electrodes in the cathode pair in order to increase the electron density in the plasma space and thereby to increase the speed of decomposition of the gas treated, i.e. the amount of the gas treated per unit volume and unit time. To prevent short-circuiting by the contact of the inside wall of the vacuum chamber with the cathode or anode, it is preferred to shield or fill the space between the inside wall and the cathode or anode with an insulator (4) such as polytetrafluoroethylene.

The length of each of the cathode pair or (1), the anode pair (2) or the auxiliary anode (2') in the direction of the gas flow passage is preferably about 10 cm to 80 cm, more preferably about 15 cm to about 40 cm. If it is too short, the plasma treating volume is small and the treating efficiency is low. If, on the other hand, it is too long, the uniformity of the plasma is difficult to maintain in the longitudinal direction of the electrodes, and moreover, the treating efficiency is drastically reduced at a downstream site.

To decompose and treat the gas effectively, the size of the cathode is preferably as large as possible in a space through which the gas to be treated flows.

Specifically, the projecting area of the cathode is preferably at least two times, more preferably 5 to 100 times, the projecting area of the anode. The projecting area of the electrode, as used in this invention is defined as the area surrounded by all points on the electrode which have the same potential.

In the apparatus of this invention according to an embodiment in which the auxiliary anode (2') is provided within a space defined by the cathode pair (1) and the anode pair (2), a plasma stable over a long period of time can be obtained by using not only a direct-current power supply but also an alternate-current power supply in which the cathode and the anode repeat reversing with a fixed period.

When the auxiliary electrode (2') is not provided in the apparatus of this invention, a spark or an arc discharge is generated in a part where the cathode and the anode are in proximity with each other as the operation is continued. Thus, the exhaust gas decomposition efficiency tends to decrease But if, according to the preferred embodiment of the invention, the auxiliary anode (2') is disposed within the discharge space, the occurrence of such phenomena can be effectively prevented and the apparatus can be operated stably over long periods of time. In the case of providing the auxiliary anode (2'), it is preferred to design the apparatus such that the projecting area of the anode becomes approximate to the total projecting area of the anode and the auxiliary anode. The distance between the anode and the auxiliary anode and the distance between the auxiliary anodes are each about 3 mm to 100 mm, preferably about 10 mm to 40 mm.

When a cathode having a porous part, such as a mesh-like plate, a perforated plate, a punching metal plate, or a slit plate is used as the cathode in this invention, the substantial area of the cathode can be decreased while maintaining the required projecting area. Accordingly, the current density at the cathode can be maintained high, and a high gas treating speed can be obtained with a small power supply. On the other hand, the anode may be in the form of not only a flat plate, but also of a shape having a void, such as a mesh-like plate, a perforated plate or a slit plate, and a rod or a needle since all that is required of the anode is to play a role of capturing and collecting electrons.

The numbers of the cathode pairs (1), the anode pairs (2) and the auxiliary anodes (2') are not particularly limited if only the above-mentioned optimum distance between cathodes is ensured. Usually, the number of these electrodes is selected from the range of 1 to 100. For example, the apparatus shown in FIG. 2 (a) has one cathode pair and one anode pair. The apparatus of FIG. 2 (e) has one cathode pair, one anode pair and four auxiliary anodes. The apparatus of FIG. 2 (d) has four cathode pairs and four anode pairs. The apparatus shown in FIG. 2 (h) has four cathode pairs, four anode pairs and 36 auxiliary anodes.

It is important for effective treatment that no gas flow should exist which is discharged without going through the plasma space. It is necessary to place the space defined by the cathode pair in communication at one end with the gas introduction opening 5 and at the other end with the gas withdrawal opening 6. The flowing direction of the gas in the gas flow passage may be parallel to the vertical line or at any angle including the vertical direction. Desirably, it is set in the vertical direction since when a solid occurs as a result of the treatment it has to be removed by free falling from the electrode surface.

Figure 3:
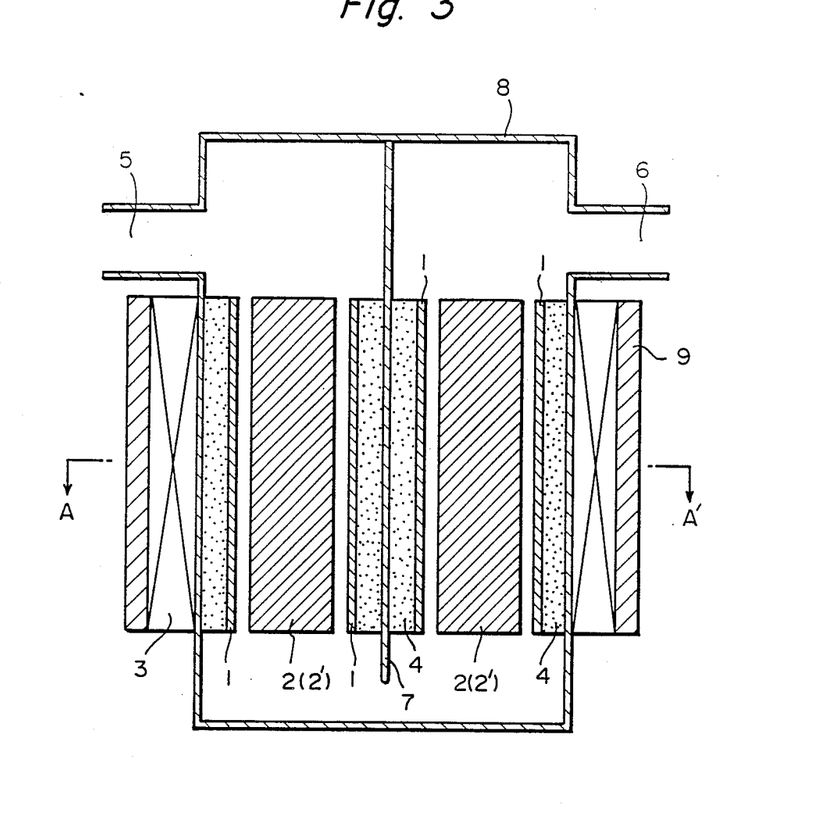
Figure 4A:
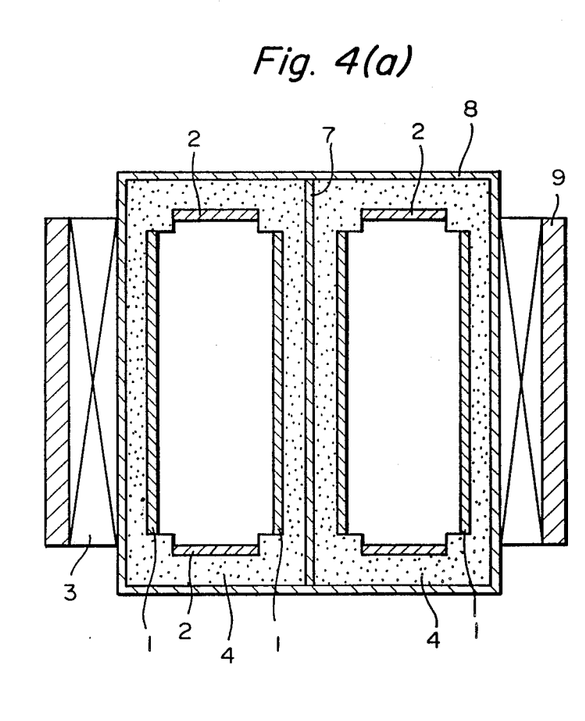
Figure 4B:
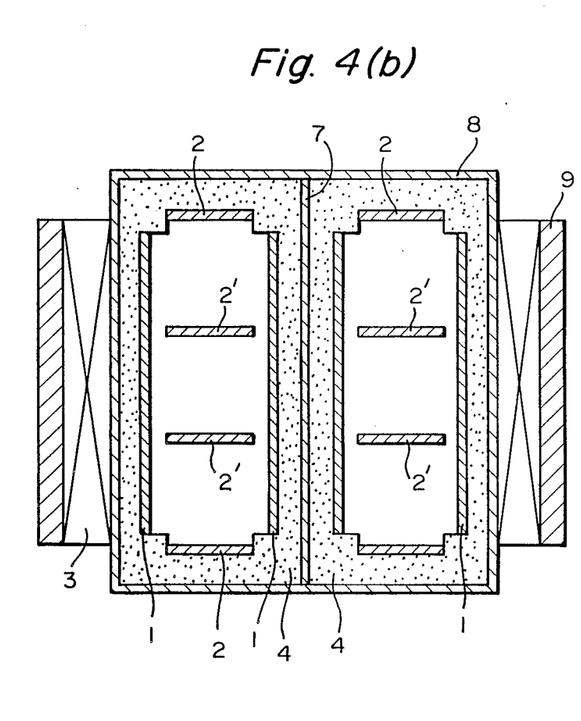

The apparatus of this invention may be one in which a plurality of electrode sets each consisting of a cathode pair comprised of two cathodes positioned opposite to each other and an anode pair comprised of two anodes positioned opposite to each other are arranged in series in the gas flowing direction, one end of the resulting electrode array is placed in communication with the gas introduction opening and the other end in communication with the gas withdrawal opening. The apparatus of this invention in accordance with this embodiment is very effective for increasing the gas treating efficiency, particularly when the amount of the gas to be treated is large. FIGS. 3, 4 (a) and 4 (b) show examples in which two such electrode sets are connected in series. FIG. 3 is a vertical sectional view, and FIGS. 4 (a) and 4 (b) are cross-sectional views taken on line A—A' of FIG. 3. The apparatus of FIG. 4 (b) is of the structure in which an auxiliary anodes are provided in the space defined by the cathode pair and the anode pair in the apparatus of FIG. 4 (a). The number of electrode set arrays may usually be within the range of 1 to about 100 depending upon the amount of the gas treated, the pressure and the supplied power.

In the apparatus of the embodiment shown in FIG. 3, the gas to be treated flows through spaces defined by the individual electrode sets first as a descending flow and then as a rising flow, and when the number of electrode sets is 3 or more, it is passed through the spaces while repeating descending and rising further.

Furthermore, in the apparatus of this embodiment, partitioning walls (7) may be provided between electrode sets disposed in series for shutting off the discharge so as to ensure the dependency of each plasma between sets of electrodes provided in series, namely to avoid moving of a plasma from one space to another. This is a very effective means for circumventing the interaction of the discharges. Preferably, the partitioning wall (7) may be an insulator such as polytetrafluoroethylene, but such insulator is not always necessary depending upon the structure of the electrode sets.

Figure 5A:
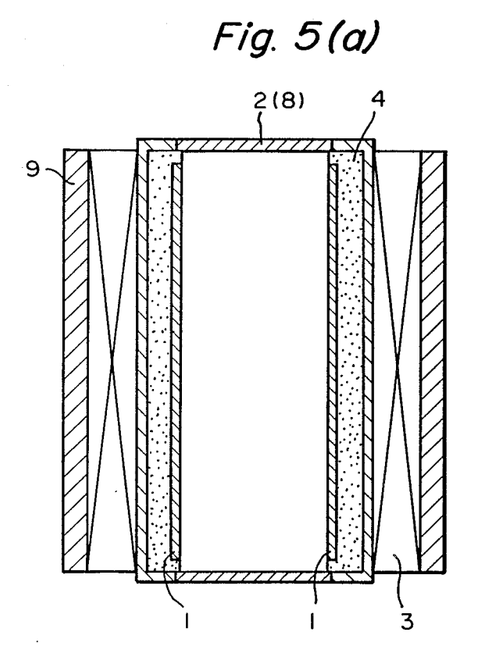
Figure 5B:
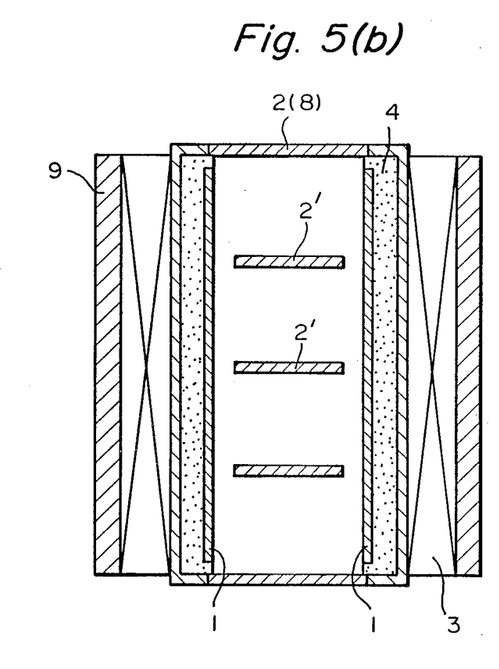

As another embodiment within the technical scope of this invention, it is possible to provide only the cathode pair (1) in the discharge tube (8), use part or the whole of the inside wall itself of the discharge tube (8) as the anode (or anode pair) (2), as shown in FIG. 5 (a), and to provide auxiliary anodes (2') in the space formed by the cathode pair and the anode pair in the apparatus of FIG. 5 (a), as shown in FIG. 5 (b). As a mere modification, it is also possible to replace the cathodes with the anodes and vice versa.

The power supply used in this invention may be a dc, ac or high-frequency power supply. The dc and ac power supplies which do not require matching are preferred, and the ac power supply is more preferred because it prevents continuation of an arc discharge. This, however, does not always apply depending upon the range of loads. Furthermore, since the plasma in this invention shows current-voltage characteristics which can generally be regarded as those of a constant voltage, the use of a constant output power supply or a constant current power supply is convenient for treating the gas continuously and stably.

In the present invention, the magnetic field applying means (3) for generating a magnetic field in the cathode opposing direction is secured to the discharge tube (8). It should be understood that the expression "generating a magnetic field in the cathode opposing direction" means that the line of magnetic force crosses in a direction perpendicular to the cathode surface or in a direction at an angle of ± about 45° to the perpendicular direction. The magnetic field may be a dc magnetic field or an ac magnetic field. The dc magnetic field generated by a permanent magnet as the magnetic field applying means is preferred because it is inexpensive and simple and suitable for performing the plasma reaction continuously The permanent magnet may usually be a sintered magnet or a plastic magnet. To increase the magnetic flux density, it is effective to use a rare earth magnet such as neodymium-iron-boron. The surface magnetic flux density to be applied is several gausses or more, preferably about 100 to 10,000 gausses.

In the actual treatment of an exhaust gas by using the apparatus of this invention, the gas to be treated is introduced, usually under a load of about 0.1 m torr to 10 torr, into a space having a magnetic field superimposed therein and defined by the cathode pair (1), the anode pair (2) and the magnetic field applying means (3). The gas is detoxified by the plasma reaction for a predetermined residence time, and then discharged from the gas withdrawal opening (6) and then released into the atmosphere via a vacuum discharge pump. It is of course possible to subject the gas discharged from the vacuum pump to conventional treatments such as a chemical treatment in order to make the treatment in accordance with this invention complete.

DESCRIPTION OF THE PREFERRED EMBODIMENTS

EXAMPLE 1

An apparatus of the type shown in FIG. 2 (a) which is one embodiment of the apparatus of FIG. 1 was used. Two (a pair of) stainless steel plates having a width of 20 cm, a length of 30 cm and a thickness of 2 mm were positioned face to face with a distance of 2 cm and used as cathode pair (1) in stainless steel vacuum chamber (8) having a capacity of 2 liters and provided with two-inch flanges for gas introduction opening (5) and gas withdrawal opening (6). Within a space defined by the cathode pair, two (a pair of) stainless steel plates having a width of 1.5 cm, a length of 30 cm and a thickness of 2 mm were positioned face to face in a direction at right angles to the cathodes via a polytetrafluoroethylene insulator (4) without contact with the cathodes to provide an anode pair (2). A ferrite magnet (3) with a surface magnetic flux density of 500 gausses was provided via polytetrafluoroethylene (4) face to face with the back surface of each cathode. A dc magnetic field was generated in the cathode opposing direction by a yoke (9). The projecting area of the cathode was 13.8 times that of the anode. The cathode pair and the anode pair were connected to a constant current dc power supply. A 100% monosilane gas (50 sccm) was introduced from the gas introduction opening (5) to generate a plasma, and evacuated by a mechanical booster pump from the gas withdrawal opening (6). The concentration of the residual monosilane gas at the gas withdrawal opening was measured by a quadrupole mass spectrometer.

Under conditions involving a pressure of 0.3 torr and a power supply of 150 W, the concentration of the residential monosilane gas was 4.5%. Under conditions involving a pressure of 0.6 torr and a power supply of 2000 W, the concentration of the residual monosilane gas was 1.1%.

EXAMPLE 2

Example 1 was repeated except that the cathodes were constructed of perforated stainless steel plates having an opening ratio of 50%. The concentration of the residual monosilane gas was under conditions involving a pressure of 0.3 torr and a power supply of 150

W was 2.4% when the distance between the anodes is five times that between the cathodes. This concentration was 0.6% under conditions involving a pressure of 0.60 torr and a power supply of 200 W.

EXAMPLE 3

An apparatus of the type shown in FIG. 4 (a) which is one embodiment of the apparatus of FIG. 3 was used. In the procedure of Example 1, two electrode sets in which the interanode distance was 10 times the intercathode distance were provided in series in a 4-liter stainless steel vacuum chamber, and a 100% monosilane gas (250 sccm) was introduced from the gas introduction opening (5), and a plasma was generated. When the sum of the powers supplied to the two electrode sets was 500 W and the pressure was 0.3 torr, the concentration of the residual monosilane gas at the gas withdrawal opening (6), measured by a quadrupole mass spectrometer, was 0.74%.

EXAMPLE 4

An apparatus of the type shown in FIG. 2 (e) which is one embodiment of the apparatus of FIG. 1 was used. Two (a pair of) stainless steel plates having a width of 20 cm, a length of 30 cm and a thickness of 2 mm were positioned face to face with a distance of 3 cm in a stainless steel vacuum chamber (8) having an inner capacity of 2 liters and provided with two-inch flanges for gas introduction opening (5) and gas withdrawal opening (6) to provide a cathode pair (1). Two (a pair of) stainless steel plates having a width of 2 cm, a length of 30 cm and a thickness of 2 mm were positioned face to face in a direction at right angles to the cathodes via a polytetrafluoroethylene insulator (4) without contact with the cathodes in a space defined by the cathode pair. Furthermore, four auxiliary anodes (2') having the same size as the anodes (2) were provided at equal intervals nearly parallel to the anodes (2) without contact with the cathodes in a space defined by the cathode pair (1) and the anode pair (2). A ferrite magnet (3) with a surface magnetic flux density of 500 gausses was provided face to face with the back surface of each of the cathodes via a polyfluoroethylene insulator (4), and a dc magnetic field was generated by yoke (9) in the cathode opposing direction. The cathode pair and the anode pair were connected to an ac power supply. A 100% monosilane gas (50 sccm) was introduced from the gas introduction opening (5) to generate a plasma, and evacuated from the gas withdrawal opening (6) by a mechanical booster pump. A fixed power was supplied to the cathodes, and the concentration of the residual monosilane gas at the gas withdrawal opening was measured by a quadrupole mass spectrometer.

Figure 2A:
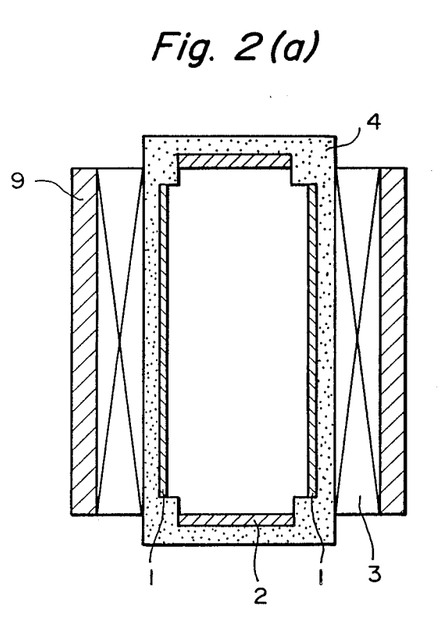
Figure 2B:
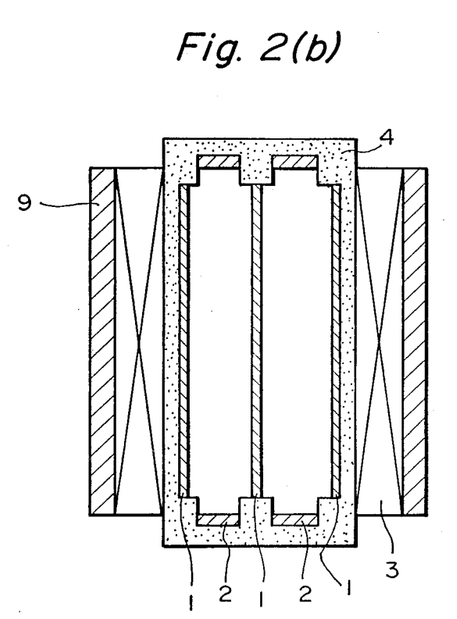
Figure 2C:
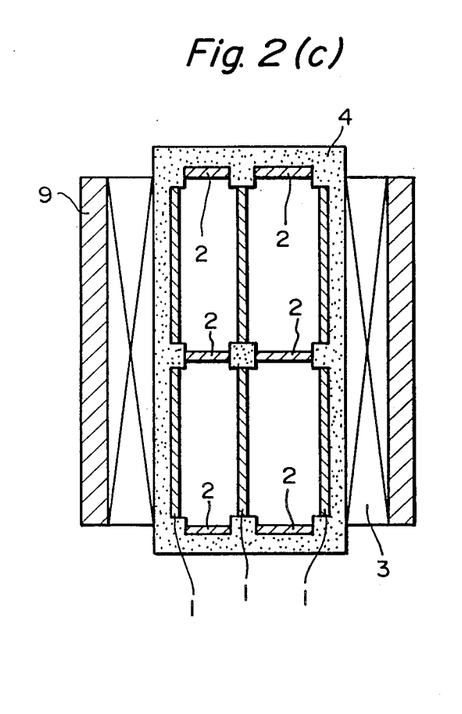
Figure 2D:
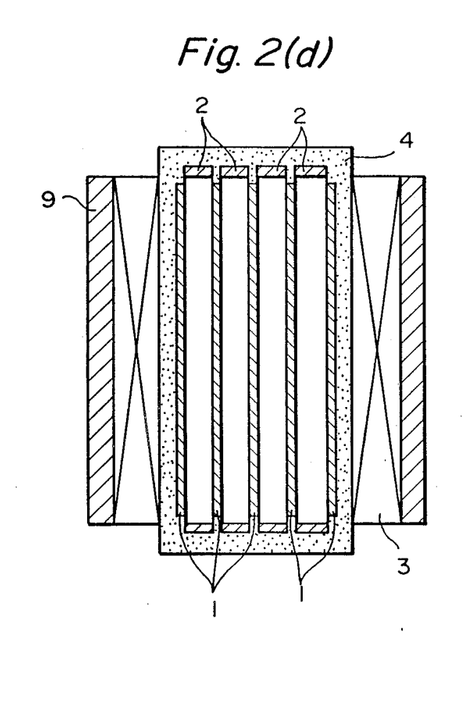
Figure 2E:
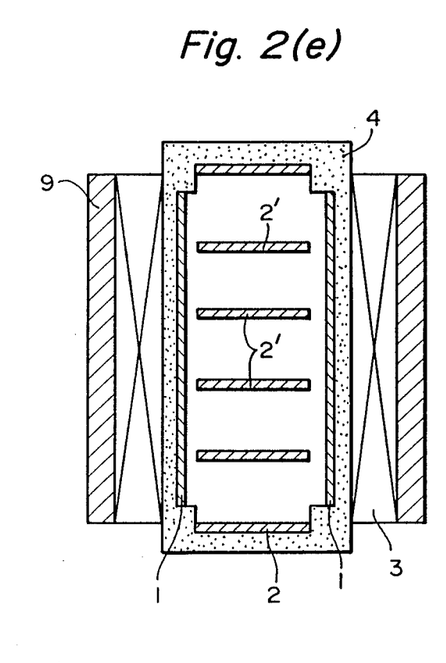
Figure 2F:
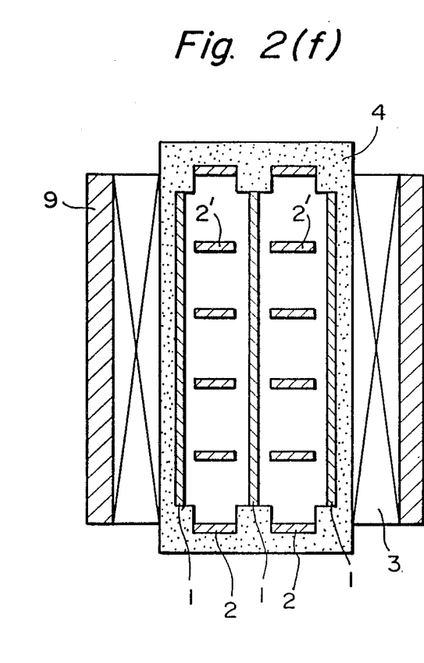
Figure 2G:
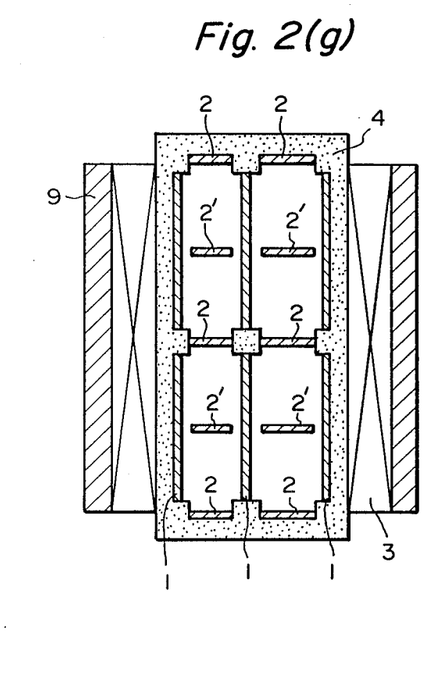
Figure 2H:
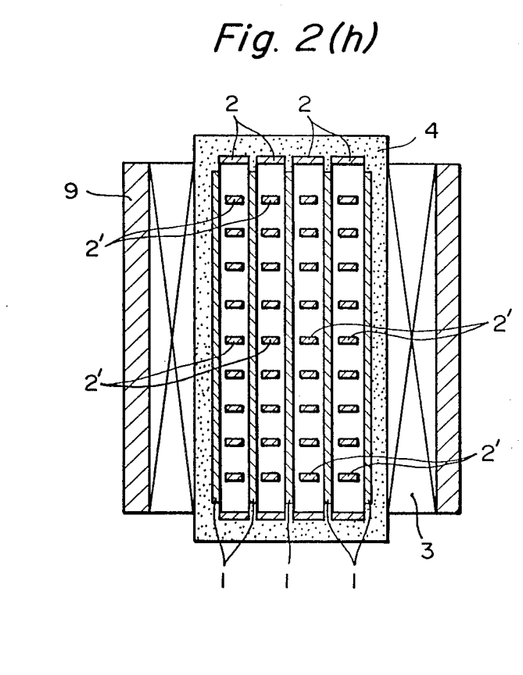

Under conditions involving a pressure of 0.3 torr and a power supply of 250 W, the concentration of the residual monosilane gas was 3.0% when the interanode distance was 10 times the intercathode distance. When no auxiliary anode was provided as shown in FIG. 2 (a), an arc discharge was generated at the end portions of the cathodes when the operation was stably continued for 1 hour. Consequently, the gas decomposing efficiency decreased. In contrast, when auxiliary anodes were provided as in this example, the operation could be continued stably for more than 100 hours.

EXAMPLE 5

An apparatus of the type shown in FIG. 4 (b) which is one embodiment of the apparatus of FIG. 3 was used. In Example 4, two electrode sets in which the interanode distance was 10 times the intercathode distance were arranged in series in a 4-liter stainless steel vacuum chamber. Furthermore, four auxiliary anodes having the same size as the anodes were provided at equal intervals nearly parallel to the anodes in a space defined by the cathode pair (1) and the anode pair (2). A 100% monosilane gas (250 sccm) was introduced from the gas introduction opening (5) and a plasma was generated. When the sum of the powers supplied to the two electrode sets was 500 W and the pressure was 0.3 torr, the concentration of the residual monosilane was at the gas withdrawal opening (7), measured by a quadrupole mass spectrometer, was 0.74%. As in Example 4, the operation could be stably continued for more than 100 hours.

According to this invention, an exhaust gas treating apparatus which is small-sized, consumes less power and can be operated stably for an extended period of time is provided for detoxifying a semiconductor exhaust gas such as a monosilane gas by the discharge treating method. Accordingly, the apparatus of this invention can be advantageously used to detoxifying toxic gases occurring in the production of the industrial production of semiconductors, and contributes greatly to the industry.

Other embodiments of the invention will be additionally described at some lengths.

Figure 6:
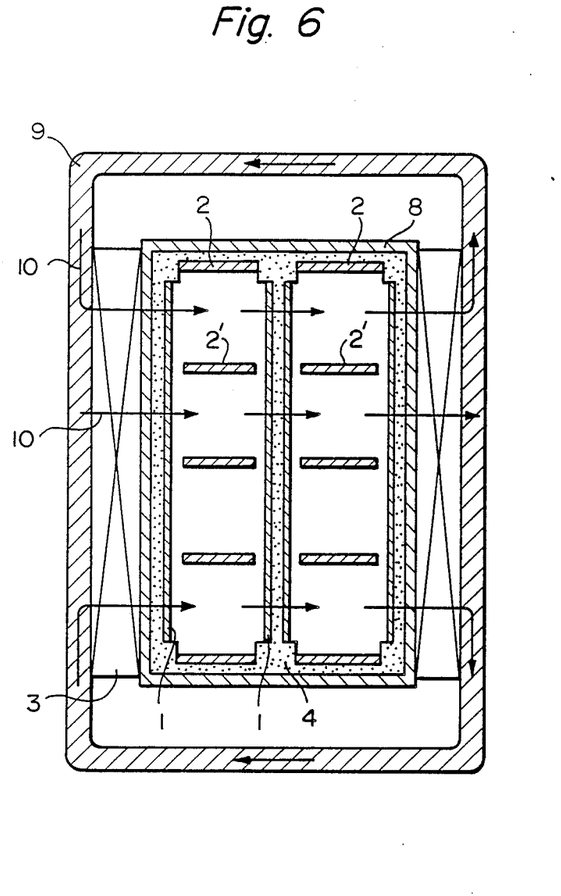
FIG. 6 is a cross-sectional view of an example of the apparatus of the invention using a closed circuit magnetic field.
Figure 7A:
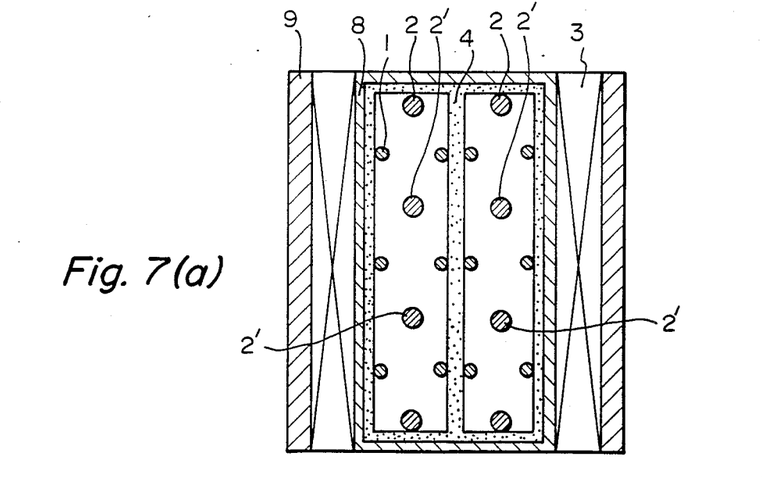
Figure 7B:
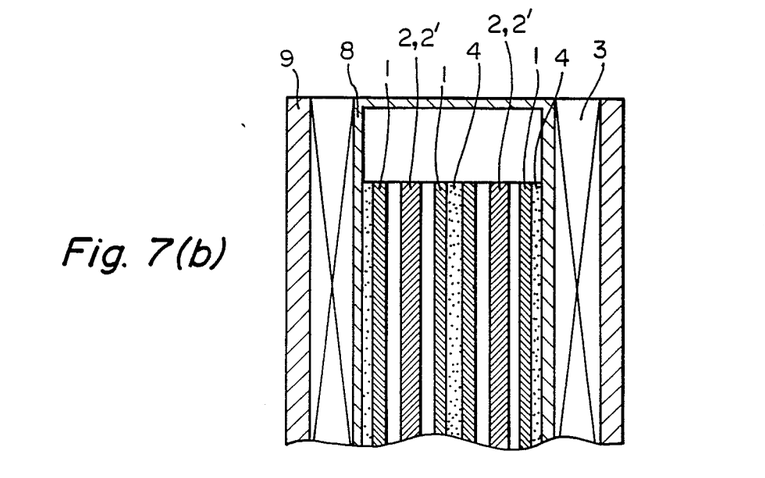
Figure 8A:
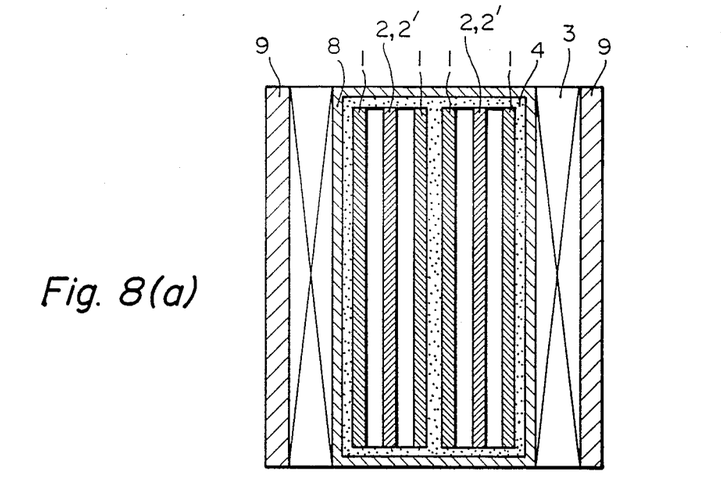
Figure 8B:
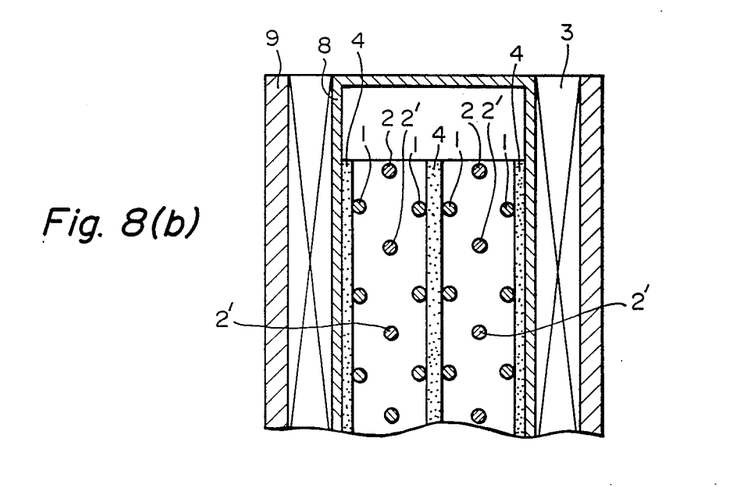

FIG. 6 shows an example in which a closed circuit magnetic field is adopted as a more effective means for generating a magnetic field. This is called a magnetic field of the H type or cyclotron type. A C-type or Weis-type magnetic field may also be conveniently applied as the closed circuit magnetic field to the apparatus of this invention.

Figure 9A:
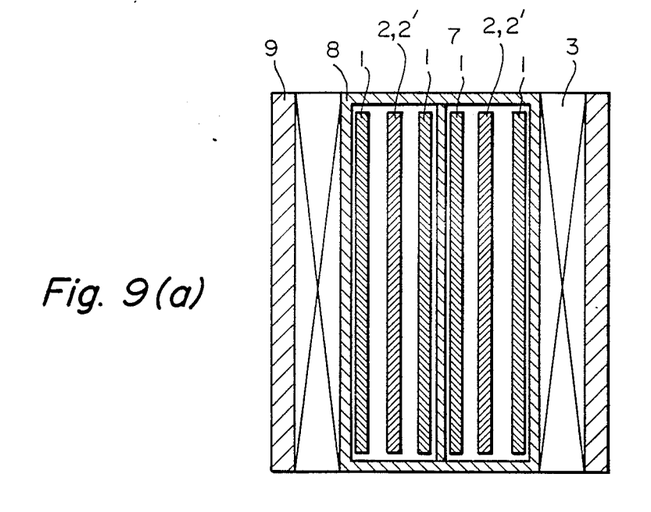
Figure 9B:
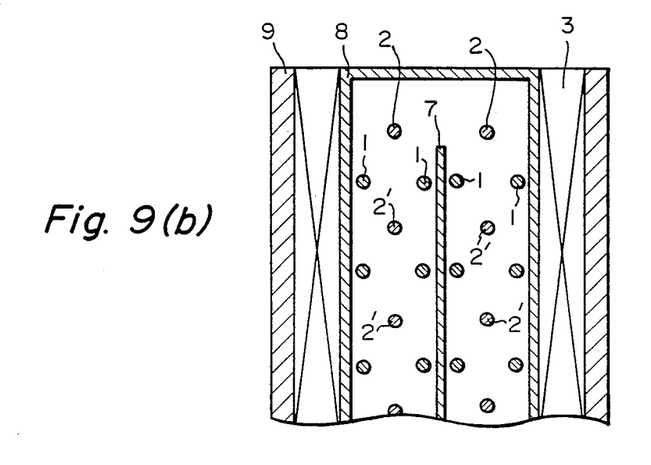
Figure 10A:
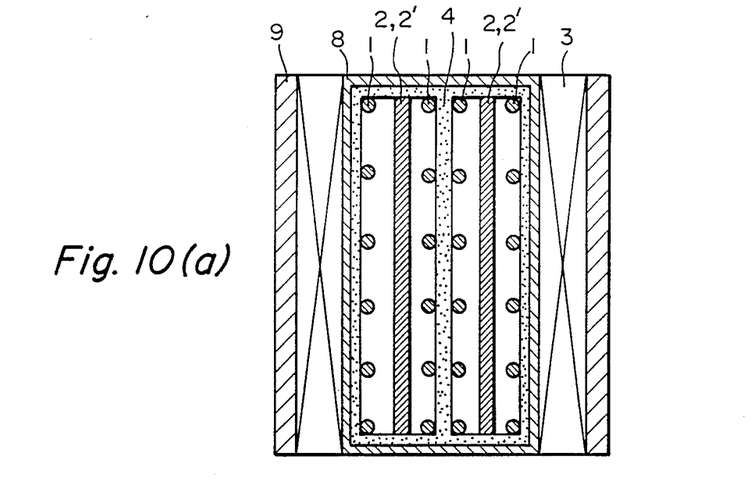
Figure 10B:
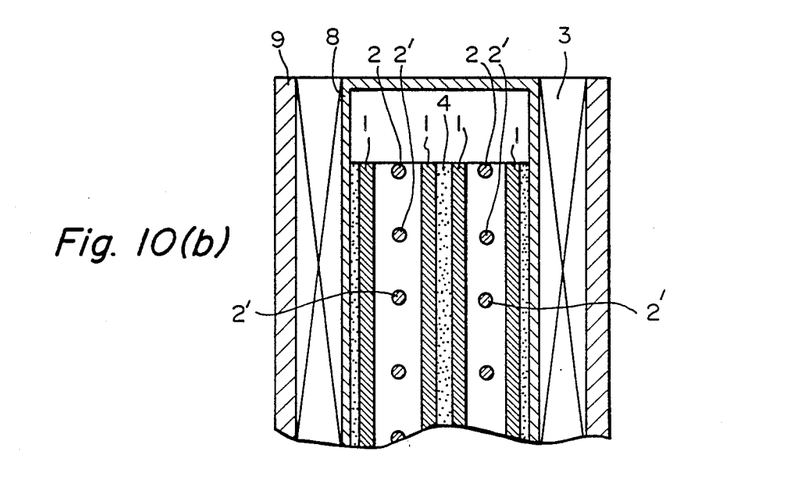

FIGS. 7 to 10 show the arrangement of columnar or rod-like electrodes in a kind of lattice sructure in space. The sectional shape of the columnar electrode may be, for example, circular, elliptical, square, rectangular or polygonal. In each of these figures, (a) shows a cross sectional view, and (b), a vertical sectional view. In FIG. 9, these columnar electrodes are suspended or self-supported in the space of the vacuum chamber. In this case, too, measures must be taken to prevent current short-circuiting between the chamber wall and the electrodes.

We claim:

1. An exhaust gas treating apparatus comprising a discharge tube which includes a tubular chamber having a gas introduction opening and a gas withdrawal opening and at least one pair of cathodes and at least one pair of anodes provided in the tubular chamber so as to form a gas flow passage, and a power supply selected from the group consisting of a dc power supply and an ac power supply connected to the electrodes; wherein the pair of cathodes is positioned opposite to each other and approximately parallel to the gas flow passage, a space formed by the pair of cathodes is in communication at one end with the gas introduction opening and at the other end with the gas withdrawal opening, the pair of anodes is positioned in said space opposite to each other in a direction nearly at right angles to the cathodes and without contact with the cathodes, and a magnetic field applying means is secured to the discharge tube for generating a magnetic field selected from the group consisting of a dc magnetic field and an ac magnetic field in the opposing direction of the cathodes.

2. The apparatus of claim 1, in which at least one of the cathodes has pores.

3. The apparatus of claim 1 in which a set of electrodes is formed of a pair of cathodes and a pair of anodes, and a plurality of such electrode sets are arranged in series to provide an array of electrode sets, and one end of the array is placed in communication with the gas introduction opening and the other end with the gas withdrawal opening.

4. The apparatus of claim 3 in which a partitioning wall for shutting off the discharge is provided between the electrode sets disposed in series.

5. The apparatus of claim 1 in which the at least one pair of anodes is provided nearly parallel to the gas flow passage.

6. The apparatus of claim 1 in which the distance between a pair of anodes is at least 2 times the distance between a pair of the cathodes.

7. The apparatus of claim 1 in which the projecting area of each cathode is at least 2 times that of each anode.

8. An exhaust gas treating apparatus comprising a discharge tube which includes a tubular chamber having a gas introduction opening and a gas withdrawal opening and at least one pair of cathodes and at least one pair of anodes provided in the tubular chamber so as to form a gas flow passage, and a power supply selected from the group consisting of a dc power supply and an ac power supply connected to the electrodes; wherein the pair of cathodes is positioned opposite to each other and approximately parallel to the gas flow passage, a space defined by the pair of cathodes is in communication at one end with the gas introduction opening and at the other end with the gas withdrawal opening, the pair of anodes is positioned in said space opposite to each other in a direction nearly at right angles to the cathodes and without contact with the cathodes, at least one auxiliary anode is provided nearly parallel to the pair of anodes in a space formed by the pair of cathodes and the pair of anodes, and a magnetic field applying means is secured to the discharge tube for generating a magnetic field selected from the group consisting of a dc magnetic field and an ac magnetic field in the opposing direction of the cathodes.

9. The apparatus of claim 8 in which at least one of the cathodes has pores.

10. The apparatus of claim 8 in which a set of electrodes is formed from a pair of cathodes, a pair of anodes and said at least one auxiliary anode, and a plurality of such electrode sets are arranged in series to provide an array of electrode sets, and one end of the array is placed in communication with the gas introduction opening and the other end with the gas withdrawal opening.

11. The apparatus of claim 10 in which a partition wall for shutting off the discharge is provided between the electrode sets disposed in series.

12. The apparatus of claim 8 in which the at least one pair of anodes is provided nearly parallel to the gas flow passage.

13. The apparatus of claim 1, in which at least one of the anodes has pores.

14. The apparatus of claim 8, in which at least one of the anodes has pores.

* * * * *